Figure 8:
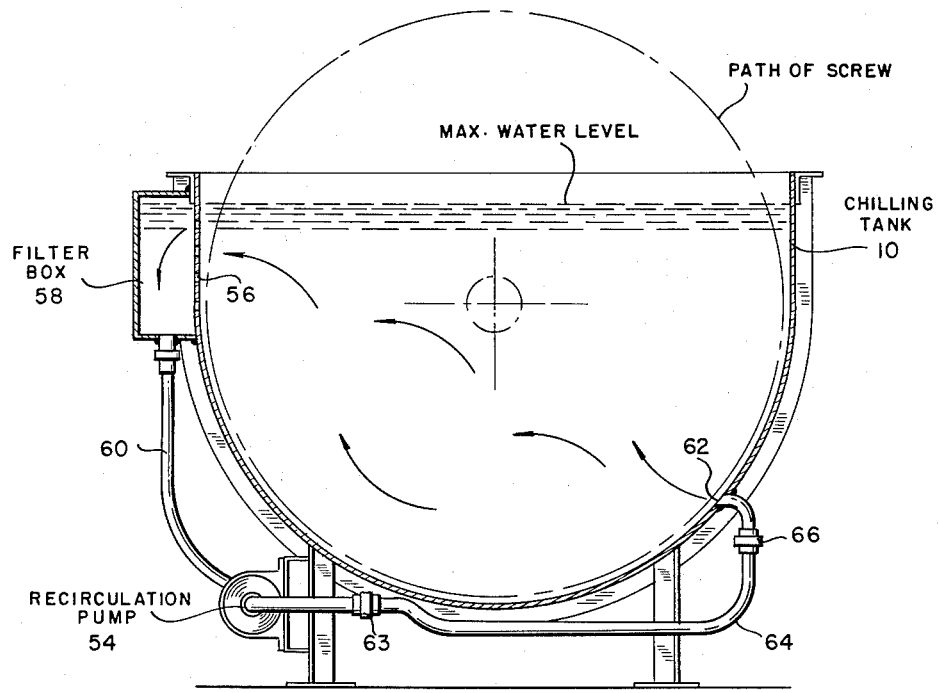

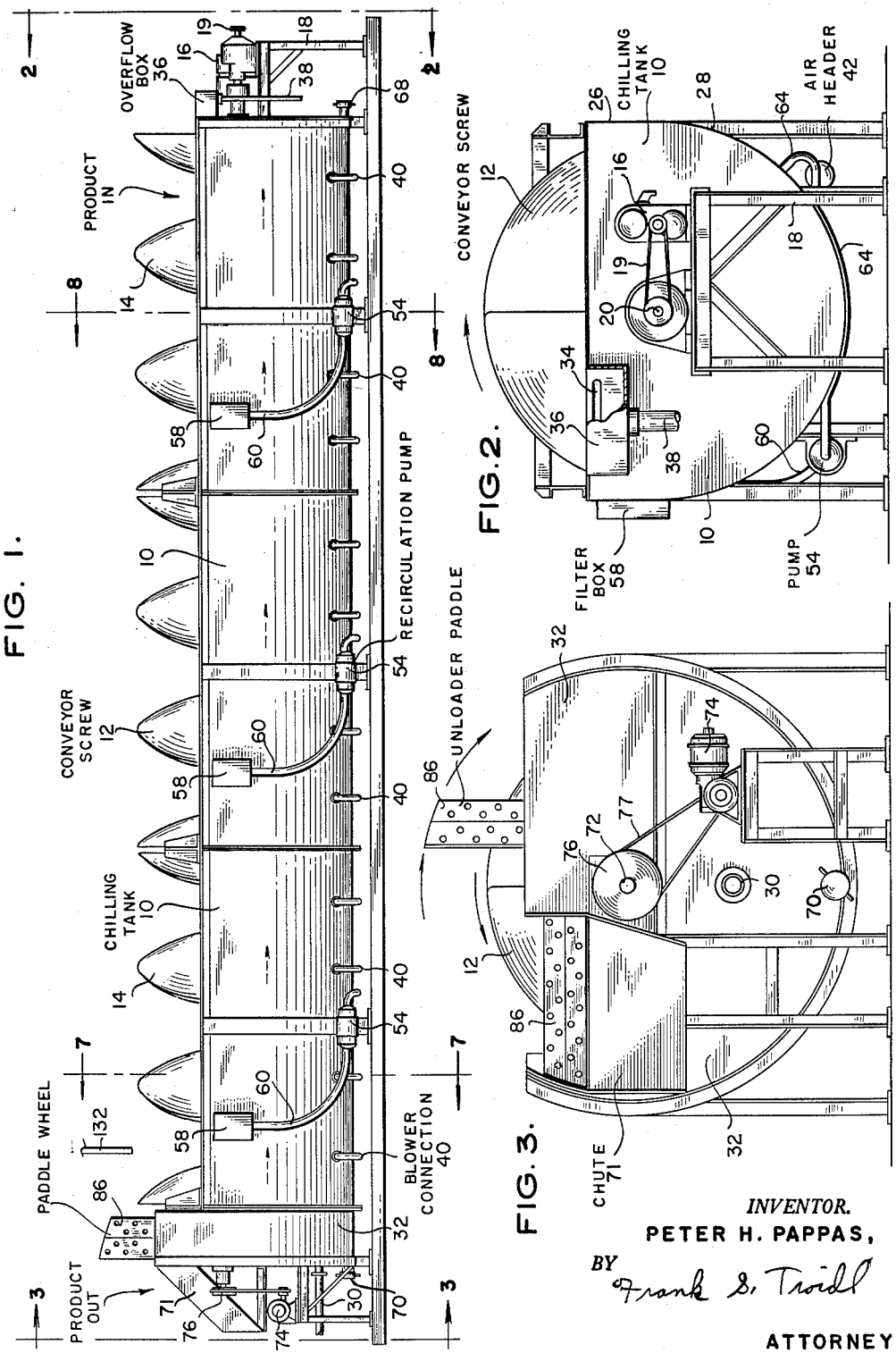

July 16, 1963 — P. H. PAPPAS — 3,097,501
FOOD CHILLING
Filed Feb. 14, 1961 — 4 Sheets-Sheet 2
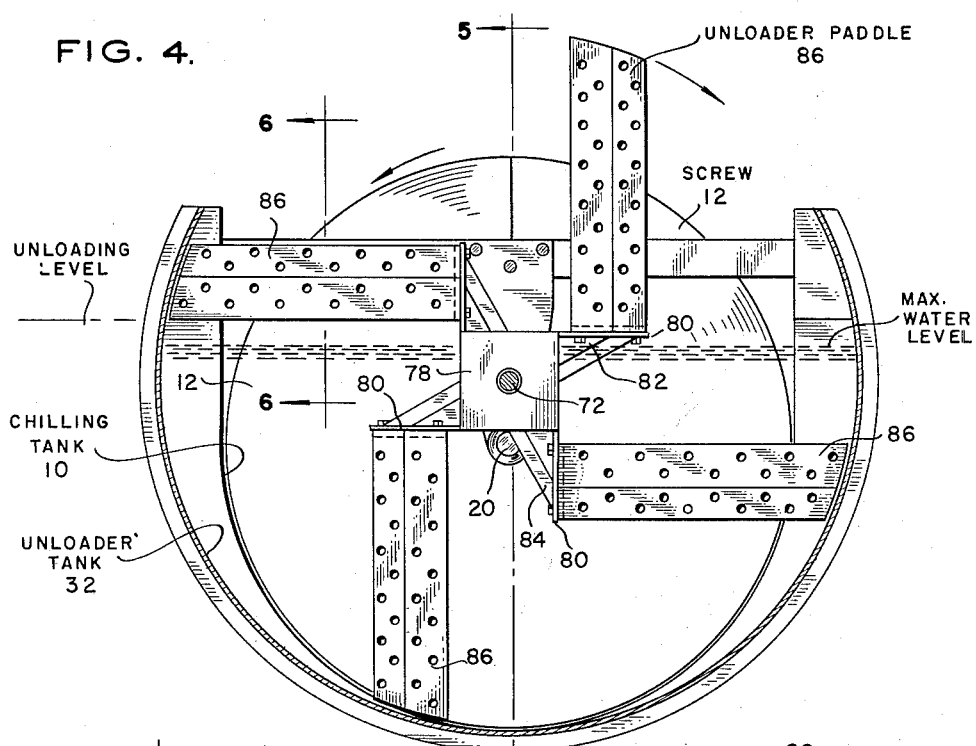
FIG. 4.
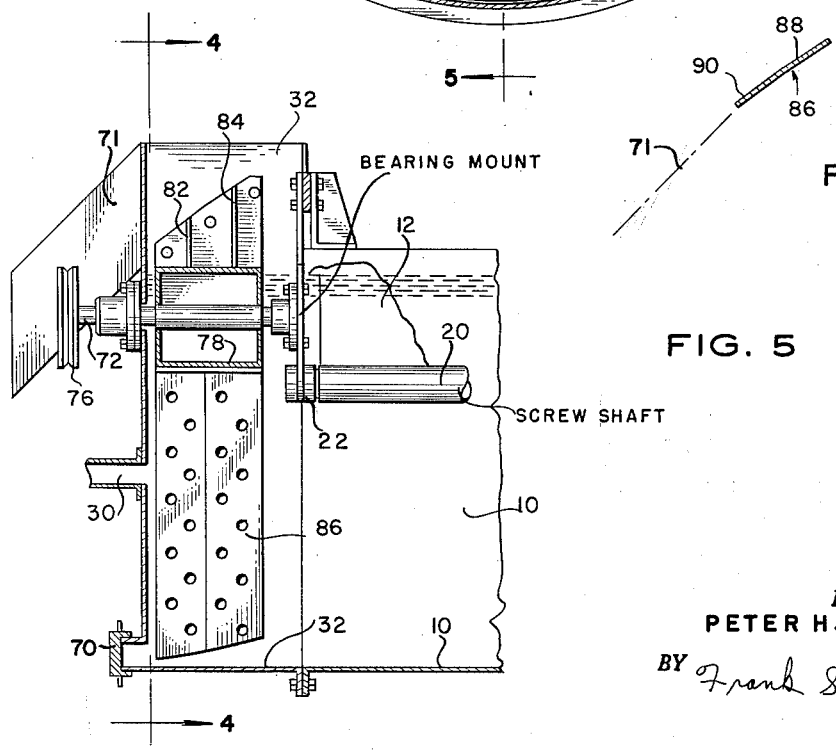
FIG. 5
FIG. 6.
INVENTOR.
PETER H. PAPPAS,
BY Frank S. Triodl
ATTORNEY.

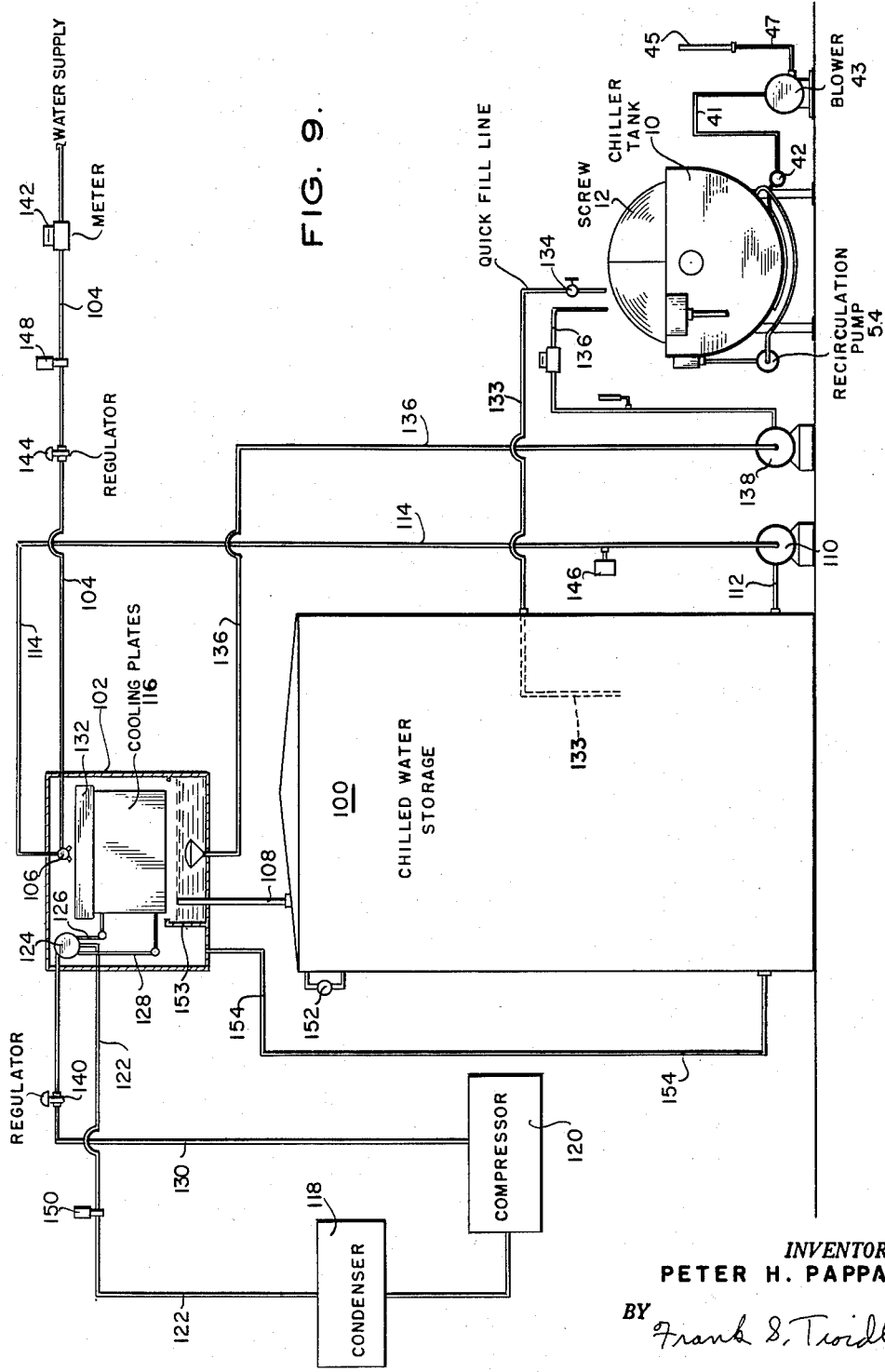

United States Patent Office 3,097,501
Patented July 16, 1963

3,097,501
FOOD CHILLING
Peter H. Pappas, Houston, Tex., assignor to Pappas Refrigeration Company, Houston, Tex., a corporation of Texas
Filed Feb. 14, 1961, Ser. No. 89,293
4 Claims. (Cl. 62—63)

This invention relates to food chilling. More particularly, this invention is an improved apparatus for more efficiently and effectively chilling animal carcasses. Another feature of this invention is the provision of an improved system and method for cooling animal carcasses.

Tanks used for chilling carcasses and other foods have been used for some time. However, the currently utilized chilling tanks have certain disadvantages which are eliminated by my new carcass chilling tank. For example, one method of chilling carcasses, such as poultry carcasses, is to conduct the poultry by means of a track through a chamber having means for spraying cool water on the poultry. This type of poultry chilling is shown in Patent No. 2,329,226 issued September 14, 1943 to E. Stafford et al. A difficulty with this type of chilling chamber is that the poultry is not completely immersed in the water. A more efficient heat transfer is obtained when the poultry is completely immersed in the water.

Other types of currently utilized carcass chilling systems include separate steps for chilling the carcasses from their initial temperature to the desired temperature of around 32° F. These systems also utilize a very bulky and complicated revolving drum for conveying the carcasses from the carcass inlet to the unloading area. Obviously, it is more desirable to perform the chilling operation in one step or one tank rather than two steps or a series of separate tanks. Also, the desirability and advantages of a simpler tank having fewer moving parts, which parts are are more easily accessible, is obvious.

My new chilling tank performs the chilling operation by conducting the carcasses through an elongated, substantially semi-cylindrical tank. The tank is open at the top so that the carcasses can be easily tossed into the tank for conveyance from one end of the tank to the unloading end of the tank. A conveyer screw which positively conveys the carcasses through the tank is provided throughout the length of the tank and coaxial with the tank. The carcasses are always immersed in water, which is supplied to the tank, preferably at the unloading end of the tank, and flows counter to the direction of movement of the carcasses.

My new carcass chilling tank arrangement can be used in conjunction with precooled water which is refrigerated to the desired temperature of around 32° F. before it is flowed into the tank. Of if desired, my new tank can be used with ice which is placed in the tank in sufficient quantity to maintain the desired temperature.

If the tank is to be used with precooled water, my new system for cooling the animal carcasses is far superior to any other currently utilized system. My new system includes a storage tank and a water cooler. Water is continuously recirculated from the water cooler to the storage tank and back to the water cooler. This provides for more efficient heat transfer in the water cooler and requires much less water than the water required by other animal carcass cooling systems, thus cutting down on costs. The recirculation system may be continuously operated. With this continuous operation and using my new system, the sizes of the compressor and condenser are reduced by 50 to 66 percent. At the beginning of each processing period, means are provided for quick-filling the chiller tank with water from the storage tank. Means are also provided for thereafter continuously supplying cool water to the chiller tank in an amount substantially equal to the amount of water overflowed from the chiller tank as the processing proceeds.

Figure 7:
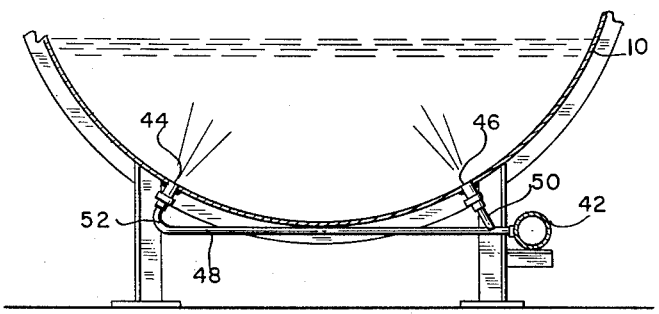

My invention, as well as its many other advantages, will be further understood by reference to the following detailed description and drawings in which:

FIG. 1 is an elevational view of the new chiller tank;
FIG. 2 is a view taken along lines 2—2 of FIG. 1;
FIG. 3 is a view taken along lines 3—3 of FIG. 1;
FIG. 4 is an elevational view showing the carcass unloading means of my new chiller;
FIG. 5 is a view taken along lines 5—5 of FIG. 4;
FIG. 6 is a view taken along lines 6—6 of FIG. 4;
FIG. 7 is a view taken along lines 7—7 of FIG. 1;
FIG. 8 is a view taken along lines 8—8 of FIG. 1; and
FIG. 9 is a schematic flow diagram illustrating my new system for cooling animal carcasses employing precooled water.

Referring to the drawings, the new chilling arrangement includes an elongated tank 10. The tank 10 has mounted therein a conveyer screw 12 having a continuous flight 14. The diameter of the flight of the conveyer screw 12 is slightly less than the diameter of the tank 10. Thus, as carcasses such as poultry are thrown into the "product in" end of the tank, the conveyer screw 12 will move the carcasses through the tank 10 and toward the "product out" or unloading end of the tank 10.

The conveyer screw 12 is operated by means of a variable screw drive motor 16 mounted on the motor support 18 and connected by belt 19 to the drive shaft 20 extending through the conveyer screw 12. The other end of shaft 20 is mounted in a bearing 22 connected to the lower portion of a bearing mount 24 (see FIG. 5).

Looking at FIG. 2, it can be seen that the shaft 20 extending through the conveyer 12 is along the axis of the tank 10, with the tank being substantially semi-cylindrical in shape. However, each side of the tank has a portion 26 which is vertical. The tank curves as at 28 beneath a plane passing through the shaft 20.

A cool water inlet pipe 30 provides for the introduction of cool water into the tank 10. This inlet pipe 30 is shown connected to the unloader casing 32 of the tank 10. Thus, as the carcasses are being moved from the "product in" end of tank 10 toward the "product out" end, the cool water flows in an opposite direction to the direction of movement of the carcasses. This counterflow movement of water and carcasses provides for the utmost in efficiency of heat transfer to chill the carcasses.

At the "product in" end of tank 10 there is provided a slotted hole 34 leading into an overflow box 36 (see FIG. 2). The overflow from overflow box 36 is conducted through fluid conduit 38 to waste.

A plurality of longitudinally spaced air conduit pipes 40 are provided adjacent the bottom of tank 10. As shown more clearly in FIG. 7, the air flowing through the air header 42 flows into the bottom of the tank 10 by means of orifice 44 and orifice 46. The air is conducted from air header 42 through tubing 48, through T coupling 50 to orifice 46, and through elbow coupling 52 to orifice 44. The flow of air from orifices 44 and 46 provides for a cross-circulation of the air in the tank to agitate the carcasses to improve the heat transferring action. Air under pressure is supplied to header 42 from air blower 43 through conduit 41 (see FIG. 9). The blower 43 receives air from the air intake 45 through air conduit 47.

Also provided on the tank 10 are a plurality of longitudinally spaced apart water recirculating pumps 54. As shown clearly in FIG. 8, the pumps 54 draw water from adjacent the top of the water level in tank 10. The water is drawn through holes 56 formed in the tank 10 and leading to a filter box 58. The filter box 58 is connected to the pumps 54 by means of water hose 60. The pumps 54 are also connected to an opening 62 in the lower portion of the tank 10 by coupling 63, hose 64, and coupling 66. Notice (FIG. 1) that each orifice 62 is further from conduit 30 than the respective filter box 58 for each recirculating system. Thus, this recirculating system not only provides for a cross-circulation of the water in the tank, but also provides for additional longitudinal agitation of the water and of the carcasses. This also improves the heat transfer between the water and the carcasses, thus providing better chilling.

Drain 68 is provided at one end and drain 70 is provided at the other end of the tank 10 for draining the tank 10 at the end of the processing period.

The unloader casing 32 is connected to the tank 10 and forms a continuation thereof. The unloader casing 32 encloses the carcass unloading mechanism, which is best shown in FIGS. 4 and 5. Referring to these figures, the unloader includes a paddle wheel mounted for rotation within the unloader casing 32. The paddles are used to pick up the carcasses and unload the carcasses through the chute 71. The paddles are rotated by means of a shaft 72 extending through the outer edge of the casing 32 and rotated by means of a motor 74 connected to the grooved wheel 76 by belt 77 (see FIG. 3). As seen clearly in FIGS. 4 and 5, the wheel 76 and shaft 72 are offset from the screw shaft 20 of the conveyer screw 12. This offset arrangement, as well as the special construction of the unloading paddle wheel, permits the carcasses to be picked up by the paddle wheel and discharged down chute 71 without any appreciable amount of water overflowing from the casing 32 down the chute 71, and without requiring unnecessarily bulky equipment.

Mounted to the shaft 72 is a square shaped hub 78. Extending from each corner of the hub 78 is an unloader plate support 80. Each plate support 80 is given strength by means of gussets 82 and 84. The paddles 86 extend from the unloader plate support 80 and run at right angles to said supports. The paddles 86 occur on the same relative side of supports 80 so that all of the paddles 86 have the same rotary direction in relation to the center. In general appearance, the paddle arrangement is in the form of a swastika. The paddles 86 are formed in two sections 88 and 90 (see FIG. 6), with the sections being joined at a slight angle. This provides a slope for the carcasses to fall downwardly into the chute 71 when the paddles reach the chute 71.

Notice that the unloader casing 32 is generally circular in cross section, with the axis being along the shaft 72 (which is offset from the shaft 20 of the conveyer screw in tank 10). The lower portion of the casing 32 is flush with the lower portion of the tank 10. This provides the spacing on the sides between the tank 10 and the casing 32. This arrangement, along with the particular structure of the unloading paddles, causes the paddles 86 to be horizontal when they are flush with the opening of the chute 71, and also prevents overflow of water from the tank into the chute.

When the new chiller tank is used with crushed ice, the tank 10 is filled as quickly as possible up to the center line of the screw and then water is metered to flow through conduit 30 into the tank 10 at a predetermined g.p.m. rate. Enough flaked or crushed ice is dispensed into the tank 10 until the water has been reduced to at least a temperature of 40° or lower before bringing the product into the tank 10. Enough ice is then admitted into the chiller to keep the water at the "product out" end at a temperature of about 32°. The carcass is placed into the screw conveyer at the "product in" end, at which end the water is the warmest. This is very desirable in that the carcass is able to absorb some of the moisture it lost in the process of being eviscerated.

The product then begins to go upstream into colder water gradually. The air agitation and the pumping of the water stirs the carcasses whereby every carcass is always under water and being chilled. The best chilling and moisture pickup for poultry, for example, is obtained when the machine is running at a speed that takes 90 minutes for each carcass to go through a chiller tank of say 50 feet in length.

However, if desired, my new system and method for providing precooled water for cooling animal carcasses may be used in place of the ice method. This system is shown in FIG. 9.

Referring to FIG. 9, I provide a large storage tank 100. The storage tank 100 is supplied cool water from a water cooler 102. A water supply, such as city water, is flowed to water cooler 102 through water line 104 and distributing head 106. The cooled water from water cooler 102 overflows into the water storage tank 100 through the overflow pipe 108. Water is continuously recirculated from the water cooler 102 to the storage tank 100 and back to the water cooler 102 by means of a pump 110 which pumps water from storage tank 100 through lines 112 and 114 to the water cooler 102. The cooling plates 116 (only one plate being shown) are supplied a refrigerant by means of a refrigeration system including condenser 118 and compressor 120. The refrigerant is fed to the plates 116 from condenser 118 through line 122, surge tank 124 providing a high side float control, line 126, into the cooler plates 116, and then through line 128 back to the surge tank 124 and refrigerant return line 130 back to the compressor 120.

A distributing pan 132 is located just above the plates 116. The distributing pan 132 is provided with a thin longitudinal slot (not shown) which receives the top edge of the plates 116. Thus, water flowing into the pan 132 from distributing head 106 flows in a thin film downwardly over the cooling plates 116. It has been found that much more efficient heat transfer is obtained if a continuous supply of water is provided over the plates 116 to keep a continuous thin film on the plates. Thus, by providing a 24-hour recirculation between water cooler 102 and water storage tank 100, the size of the equipment necessary to cool the same amount of water is reduced by 50 to 66 percent. The chilled water storage tank 100 also assures the adequate supply of chilled process water at the start of the processing operation.

A first water conduit 133, having a manually controlled valve 134, is connected to the storage tank 100 and leads from the storage tank 100 to the chiller tank or receptacle 10. The fluid conduit 133 is used to initially quickly substantially fill the tank 10 with water at the beginning of the processing operation. A second water conduit 136 is connected to the water cooler 102 and leads from the water cooler 102 through a water pump 138 to the tank 10. The fluid conduit 136 is used to supply a predetermined amount of cool water to the tank 10 to replace the amount of water which overflows from the tank 10 during the processing operation.

The temperature of plates 116 is controlled by means of a back pressure regulator 140 located in the refrigerant return line 130 from the surge drum 124 to the compressor 120.

Fresh city water is supplied through line 104 through the metering device 142 to provide a predetermined amount of water. The pressure of the water is maintained uniform by the pressure regulator 144 which compensates for varying city water pressure. The city water enters the distributing head 106 and blends in with the recirculated cool water from the storage tank 100. This blended water flows over the plates 116 for further cooling into the water bin underneath. Part of the coolest water is introduced to the tank 10 during the processing operation as above described. The remainder of the cool water overflows into the storage tank below. Thus, for example, if the plate coils are designed for 80 g.p.m. to flow over the plates, only 20 g.p.m. of fresh tap water and 60 g.p.m. of prior refrigerated water from the storage tank 100 is required to be repassed over the plates in order to draw the temperature in the tank 10 to as close to 32° as possible. This method reduces the refrigeration equipment requirements to the lowest possible size.

A pressure switch 146 is located in line 114. This pressure switch is electrically interlocked with solenoid valve 148 in line 104 and solenoid valve 150 in line 122. The pressure switch 146 is also electrically interlocked with the pump 138. Therefore, if for some reason the pump 110 should stop operating, the pressure switch transmits a signal to solenoid valves 148 and 150 and pump 138 to shut down the system.

A float switch 152 is connected adjacent the upper end of the storage tank 100. If too much water is placed in tank 100, the float switch 152 is actuated to close the solenoid valve 148, thus stopping the further supply of city water.

A weir 153 extends upwardly from the bottom of water cooler 102. Any water which flows over the top of weir 153 flows into drainage line 154.

In the operation of the system of FIG. 9, the valve 134 is opened and water admitted from storage tank 100 to fill the tank 10 up to the center line of the screw 12. This gravity fill takes place in approximately 7 to 10 minutes, whereas any other method would take from 1 to 2 hours. Line 133 is then closed and pump 138 in line 136 started to supply cold water from cooler 102 which flows through the meter in line 136 to the tank 10 at a predetermined g.p.m. rate. The air blower 43 is then started and all of the pumps on the tank 10 are also started.

Then the screw drive and the paddle wheel are started. The gear-drive speed on the screw is set to operate at a rate to handle the product in-take so that the product will stay in the tank 10 about 90 minutes before being discharged.

I claim:

1. A system for cooling animal carcasses comprising: a large receptacle into which the carcasses are placed, a water cooler for cooling water supplied to said water cooler for use in cooling the carcasses, and a water storage tank; unloading means at one end of the receptacle for unloading the properly cooled carcasses; means for moving the carcasses through the receptacle and toward the unloading means; water conduit means leading from the storage tank to the receptacle for initially filling the receptacle with water; water overflow means on said receptacle; means for flowing cooled water directly from the water cooler to the receptacle to keep the receptacle supplied with fresh cool water; and means for continuously recirculating cooled water from the water cooler to the storage tank and back to the water cooler.

2. A method of cooling animal carcasses comprising the steps of: initially flowing stored water from a water storage tank to a receptacle into which the carcasses are placed; then continuously moving carcasses through the water in the receptacle to an unloading means while continuously supplying make-up water to the receptacle from a water cooler; then when it is desired to stop the cooling of carcasses for an extended period of time, discontinuing the supplying of make-up water, draining all the water from the receptacle and leaving said receptacle drained until it is desired to again cool animal carcasses; and simultaneously with and during all of the foregoing steps, continuously recirculating cool water from the water cooler through the water storage tank and back to the water cooler.

3. A system for cooling animal carcasses comprising: a storage tank; a water cooler; means for supplying water to the water cooler; recirculating means for continuously circulating cool water from the water cooler to the storage tank and back to the water cooler; a receptacle into which the carcasses are placed, said receptacle having means for longitudinally moving the carcasses therethrough, and means for permitting water to flow from said receptacle; a first water conduit connected to the storage tank and leading from the storage tank to the receptacle and adapted to provide a path for water used to initially quickly substantially fill the receptacle with water; a second water conduit leading from the water cooler to the receptacle; and means for feeding cool water from the water cooler through the second water conduit to the receptacle at a rate substantially equal to the amount of outflow from the receptacle.

4. A system for cooling animal carcasses comprising: a storage tank; a water cooler; means for supplying water to the water cooler; recirculating means for continuously circulating cool water from the water cooler to the storage tank and back to the water cooler; a receptacle into which the carcasses are placed; a conveyor screw mounted in said receptacle; means for unloading the carcasses from said receptacle; means for permitting water to flow from said receptacle; a first water conduit connected to the storage tank and leading from the storage tank to the receptacle and adapted to provide a path for water used to initially quickly substantially fill the receptacle with water; a second water conduit leading from the water cooler to the receptacle; and means for feeding cool water from the water cooler through the second water conduit to the receptacle at a rate substantially equal to the amount of outflow from the receptacle.

References Cited in the file of this patent

UNITED STATES PATENTS

| | | |
|---|---|---|
| 1,290,396 | Steere | Jan. 7, 1919 |
| 1,363,053 | Pierson | Dec. 21, 1920 |
| 1,420,740 | Petersen | June 27, 1922 |
| 1,435,285 | Foster | Nov. 14, 1922 |
| 2,196,643 | Reeh | Apr. 9, 1940 |
| 2,854,827 | Lockerbie et al. | Oct. 7, 1958 |
| 2,942,429 | Van Dolah et al. | June 28, 1960 |
| 2,974,914 | Garland | Apr. 18, 1961 |